United States Patent [19]

Arlett

[11] 4,079,514

[45] Mar. 21, 1978

[54] HAND TOOLS

[75] Inventor: John Arlett, Camberley, England

[73] Assignee: Wilkinson Sword Limited, England

[21] Appl. No.: 706,120

[22] Filed: Jul. 16, 1976

[30] Foreign Application Priority Data

Jul. 16, 1975 United Kingdom .............. 29745/75

[51] Int. Cl.² ............................................. B26B 13/16
[52] U.S. Cl. ...................................................... 30/261
[58] Field of Search ................ 30/261, 262, 212, 234, 30/235; 81/407

[56] References Cited

U.S. PATENT DOCUMENTS

| | | | |
|---|---|---|---|
| 3,416,226 | 12/1968 | Pfaffenbach | 30/261 |
| 3,559,286 | 2/1971 | Pfaffenbach | 30/261 |

Primary Examiner—Jimmy C. Peters
Attorney, Agent, or Firm—Leydig, Voit, Osann, Mayer & Holt, Ltd.

[57] ABSTRACT

A hand tool, such as a pruner, has two pivotally movable members which are biassed apart by a helical spring disposed in a slot in one of the members, the slot being arcuate about the pivotal axis of the members. One end of the spring abuts one end of the slot and the other end of the spring is engaged by a pin which projects into the slot from the other member.

2 Claims, 3 Drawing Figures

HAND TOOLS

This invention relates to hand tools comprising two cooperating members which are arranged to be moved relatively to one another by handles which are connected to the respective cooperating members. Examples of such tools include garden pruners, lawn-edge trimmers, and scissor-like tools for kitchen and household use.

According to the present invention, there is provided a hand tool comprising two members which are movable towards one another by handles connected to or forming part of the respective members, and a spring biassing the members apart, said spring being guided for expansion and contraction in a slot in a first one of said members, and wherein said spring is so connected to the second member of said members that an increase in the force of the spring occurs in response to relative movement of the members towards one another.

The present invention also provides a hand tool comprising two members which are interconnected by a pivot and are movable relatively towards one another by handles connected to or forming part of the respective members and in opposition to the return force of a spring, the spring being confined in a slot in a first one of said members, which slot is arcuate about the axis of the pivot, one end of the spring engaging with the first member, the opposite end of the spring having a connection with the second of said members so that relative movement of the members towards one another deforms said spring and increases said return force.

One construction of hand tool in accordance with the present invention will now be described, by way of example only, with reference to the accompanying drawings in which.

Figure 1:
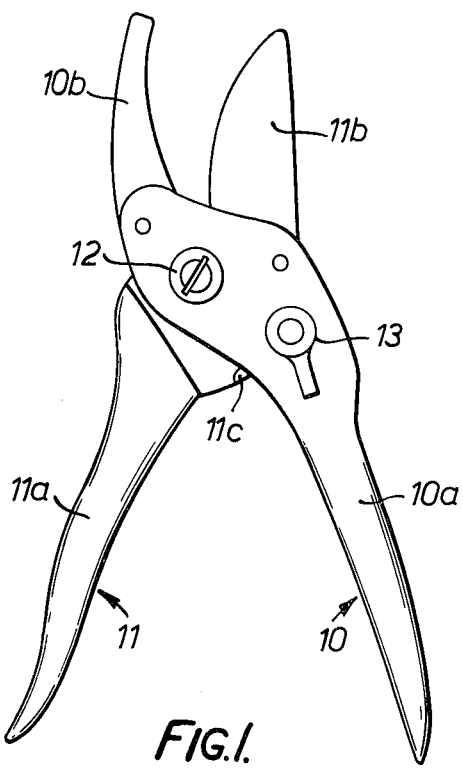
FIG. 1 is a side view of a pruner.
Figure 3:
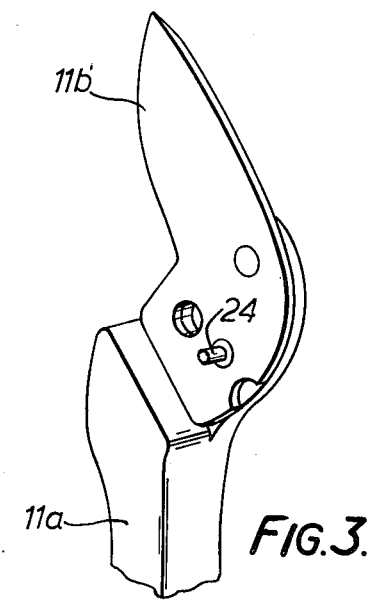
FIG. 3 is a perspective view of one blade and portion of the handle connected thereto, seen from the side opposite to that seen in FIG. 2.
Figure 2:
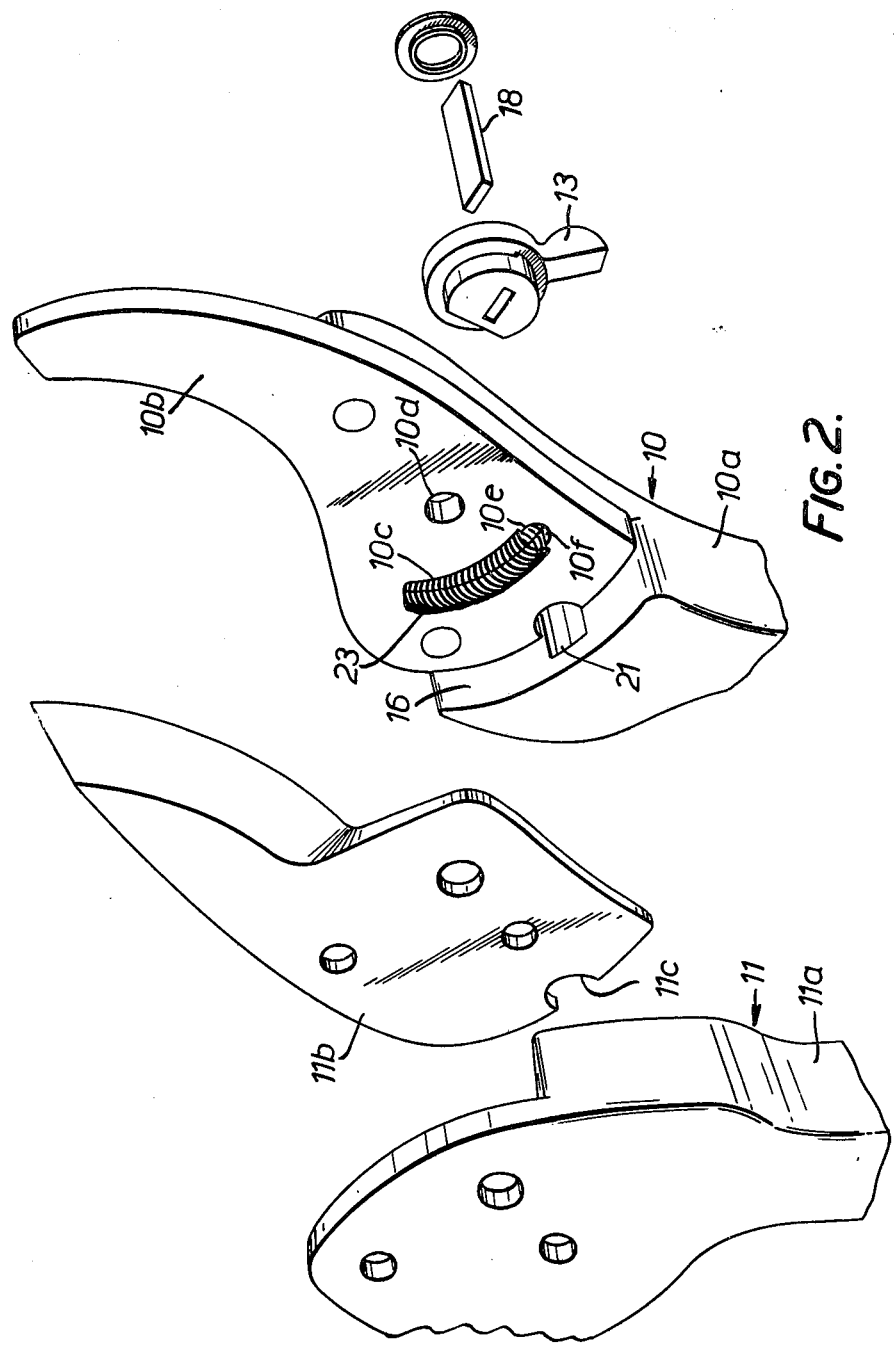
FIG. 2 is an exploded perspective view of the main part of the pruner of FIG. 1 showing the blades of the pruner and portions of the handles connected thereto.

As shown in the drawings, the pruner comprises two members 10, 11 which are interconnected by a pivot bolt 12, the member 10 consisting of a handle 10a and female blade 10b and the member 11 consisting of a handle 11a and male blade 11b. Each blade is riveted to, or located by pins on, its associated handle. By squeezing the handles in the hand of the user, the blades are brought together in a cutting action. A rotary catch 13 is mounted on the member 10 for rotation about an axis parallel to the pivot blt. This catch incorporates a detent 18 which, when the pruner is closed, can be rotated by rotation of the catch to engage a notch 11c in the blade 11b, as shown, or in the handle 11a, to lock the handles in the closed position. Such catches and detents are known per se, but a catch particularly designed for the illustrated pruner forms the subject of a patent application filed simultaneously with the present application.

The catch holds the pruner blades in the closed position against the return force of a spring which serves to urge the blades apart. In the illustrated embodiment the spring 23 is a helical spring which is received in a slot 10c in the female blade 10b, the slot being arcuate about the pivot bolt aperture 10d in the blade 10b. The spring 23 is fitted into the arcuate slot 10c under slight compression. One end of the helical spring rests against one end of the slot and the opposite end of the helical spring rests against a shoulder 10e spaced a short distance from the opposite end of the slot, thus leaving an opening 10f between said opposite end of the slot and the adjacent end of the spring. This opening is designed to receive a pin 24 projecting from the male blade 11b of the opposite handle 11 when the two handles are fitted together in the open position of the tool. The pin 24 can be an extension of a rivet by which the blade is secured to the handle.

In assembling the pruner, the blades are first riveted to or located on their respective handles, and the pin 24 is fitted to the blade, as a part of, or separately from, one of the blade-securing rivets. With the blades in their full open position, the two members 10, 11 are brought together so that their bolt-receiving apertures are in alignment and so that pin 24 fits into the recess 10f at the end of slot 10c, in effect, thereby connecting the end of the spring 10c to the pin 24. The bolt is then fitted to secure the two members together, after which the handles can be brought together against the force of the spring which will now act about the pivot bolt 12.

In use, movement of the handles towards one another about the pivot axis will move the pin 24 along the slot 10c compressing the spring 23 and providing a return force for opening the tool when the closing pressure is released.

I claim:

1. A hand tool comprising two members, two handles to which the respective members are secured and which are movable to move said members towards one another, and a helical spring biassing the members apart, said spring being guided for expansion and contraction in a slot in a first one of said members, a pin projecting from the other of said members into said slot, and movable along said slot in engagement with one end of said spring in response to relative movement of the members so that an increase in the force of the spring occurs in response to relative movement of the members towards one another, the pin lying at one end of the slot when the members are fully spaced apart, the spring being a helical spring which lies wholly within said slot and is retained therein by the first handle which closes the slot on one side thereof and by the second member which closes the slot on the opposite side thereof in all relative positions of the members, and wherein abutment means on said first of said members adjacent said one end of the slot prevent said end of the spring from engaging said end of the slot thereby creating a space into which the pin can be freely inserted to facilitate assembly of the tool.

2. A garden pruner comprising two blades, a pivot inter-connecting said blades, two handles connected to the respective blades and movable to effect movement of the members relatively to one another, the pivot also interconnecting said handles, a helical spring confined in a slot in a first one of said blades, which slot is arcuate about the axis of the pivot, one end of the spring engaging with the first blade, a pin connecting the opposite end of the spring with the second of the blades so that relative movement of the blades towards one another deforms said spring and increases the return force applied by the spring to said blades, a shoulder on said first of said blades spaced a short distance from the end of slot adjacent said opposite end of the spring and, in the fully open position of the blades, holding said opposite end of the spring away from said end of the slot to create a free space into which the pin extends, and wherein the first blade is mounted on a first one of said handles in mutually overlapping relationship and said slot extends through said first blade at such a position thereon that said first handle closes one side of the slot and the second blade closes the opposite side of the slot in all relative positions of the blades.

* * * * *